United States Patent
Santoso et al.

(10) Patent No.: US 8,201,392 B2
(45) Date of Patent: Jun. 19, 2012

(54) EMISSION REDUCTION SYSTEM FOR TURBO CHARGED ENGINE

(75) Inventors: Halim G. Santoso, Novi, MI (US); Eugene V. Gonze, Pinckney, MI (US)

(73) Assignee: GM Global Technology Operations LLC

( * ) Notice: Subject to any disclaimer, the term of this patent is extended or adjusted under 35 U.S.C. 154(b) by 821 days.

(21) Appl. No.: 12/254,089

(22) Filed: Oct. 20, 2008

(65) Prior Publication Data

US 2010/0095652 A1    Apr. 22, 2010

(51) Int. Cl.
*F01N 3/00* (2006.01)
*F01N 3/10* (2006.01)

(52) U.S. Cl. .............. 60/286; 60/285; 60/300; 60/303

(58) Field of Classification Search .............. 60/274, 60/284, 285, 286, 299, 300, 303; 123/90.17
See application file for complete search history.

(56) References Cited

U.S. PATENT DOCUMENTS

| | | | |
|---|---|---|---|
| 5,904,902 A * | 5/1999 | Matuoka et al. | 422/174 |
| 6,186,124 B1 * | 2/2001 | Stefanopoulou et al. | 123/492 |
| 2005/0016266 A1 * | 1/2005 | Rabl | 73/118.1 |
| 2008/0223019 A1 * | 9/2008 | Gonze et al. | 60/286 |

* cited by examiner

*Primary Examiner* — Thomas Denion
*Assistant Examiner* — Audrey K Bradley

(57) ABSTRACT

An emissions reduction system includes an emissions control module that selectively controls fuel injection at a lean A/F ratio based on a first temperature of a catalytic converter and that selectively turns on an electrically heated catalyst (EHC) based on the first temperature. A fuel injection module selectively injects fuel into an engine cylinder during an expansion stroke based on a second temperature of the EHC.

12 Claims, 5 Drawing Sheets

EMISSION REDUCTION SYSTEM FOR TURBO CHARGED ENGINE

FIELD

The present disclosure relates reducing emissions in a turbo charged engine.

BACKGROUND

The statements in this section merely provide background information related to the present disclosure and may not constitute prior art. Work of the presently named inventors, to the extent it is described in this background section, as well as aspects of the description that may not otherwise qualify as prior art at the time of filing, are neither expressly nor impliedly admitted as prior art against the present disclosure.

A Super Ultra Low Emission Vehicle (SULEV) is a conventionally powered or hybrid vehicle that is designed to produce minimal emissions. SULEV emission requirements may be difficult to attain for naturally aspirated engines, and may be more difficult for turbo charged engines due to a temperature drop of exhaust gases flowing through turbo charger hardware. The temperature drop leads to a delay in catalyst light-off time, which leads to increased emissions during a cold start.

SUMMARY

An emissions reduction system includes an emissions control module that selectively controls fuel injection at a lean A/F ratio based on a first temperature of a catalytic converter and that selectively turns on an electrically heated catalyst (EHC) based on the first temperature. A fuel injection module selectively injects fuel into an engine cylinder during an expansion stroke based on a second temperature of the EHC.

A method for reducing emissions includes selectively controlling fuel injection at a lean A/F ratio based on a first temperature of a catalytic converter, selectively turning on an electrically heated catalyst (EHC) based on the first temperature, and selectively injecting fuel into an engine cylinder during an expansion stroke based on a second temperature of the EHC.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
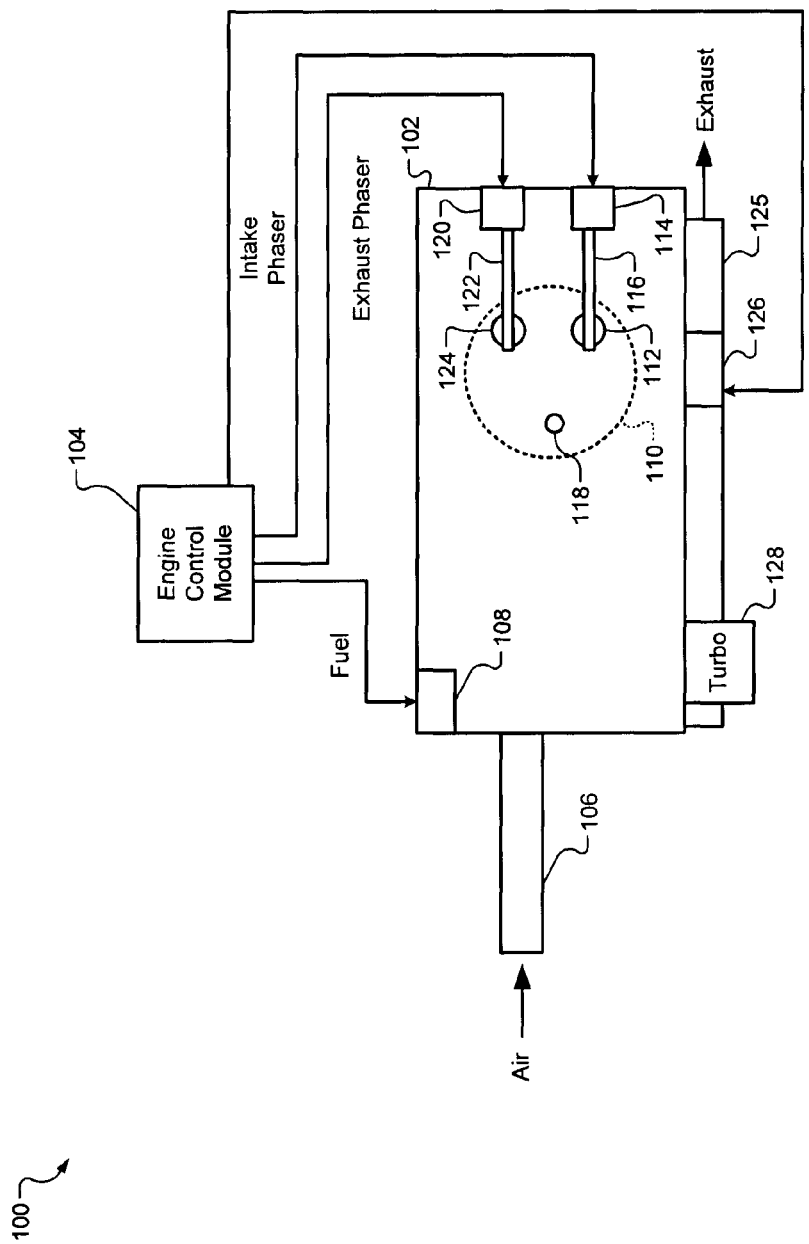
FIG. 1 is a functional block diagram of an emission reduction system for a turbo charged engine according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle 100 includes an engine 102. The vehicle 100 includes an engine control module 104. The engine control module 104 controls various components and functions of the engine 102. The engine control module 104 may perform a plurality of operations including, but not limited to, engine control, diagnostics, and maintenance. For example, the engine control module 104 receives signals from various sensors and makes adjustments, and/or calculations based on the signals.

The vehicle 100 includes an air intake 106. The vehicle also includes a fuel injector 108 to mix fuel with air. The air/fuel (A/F) mixture is received in a piston cylinder 110 through an intake valve 112. The intake valve 112 opens when an intake phaser 114 pushes down on an intake cam shaft 116. The piston cylinder 110 compresses the air and a spark plug 118 ignites the A/F mixture to oxidize the fuel and produce heat energy, propelling the vehicle 100. An exhaust cam phaser 120 actuates an exhaust camshaft 122 to open an exhaust valve 124 and expel exhaust gases from the cylinder 110. The exhaust gases flow through an exhaust structure 125. The exhaust structure 125 includes a catalytic converter 126 that removes any remaining hydrocarbon fuel that was not oxidized within the piston cylinder 110.

The vehicle 100 includes a turbo charger 128. The turbo charger 128 compresses ambient air using force from passing exhaust gases. The compressed air is delivered to the air intake 106 at a higher pressure than an engine without a turbo charger. The extra air pressure allows the fuel injector 108 to inject more fuel into the piston cylinder 110, increasing the power and torque output. Because the exhaust gas passes over the turbo charger 128 and powers a turbine within the turbo charger 128, the exhaust gases experience a significant drop in temperature. The decrease in exhaust temperature increases the time it takes for the catalytic converter 126 to heat up to a light off temperature, which increases emissions.

Figure 2:
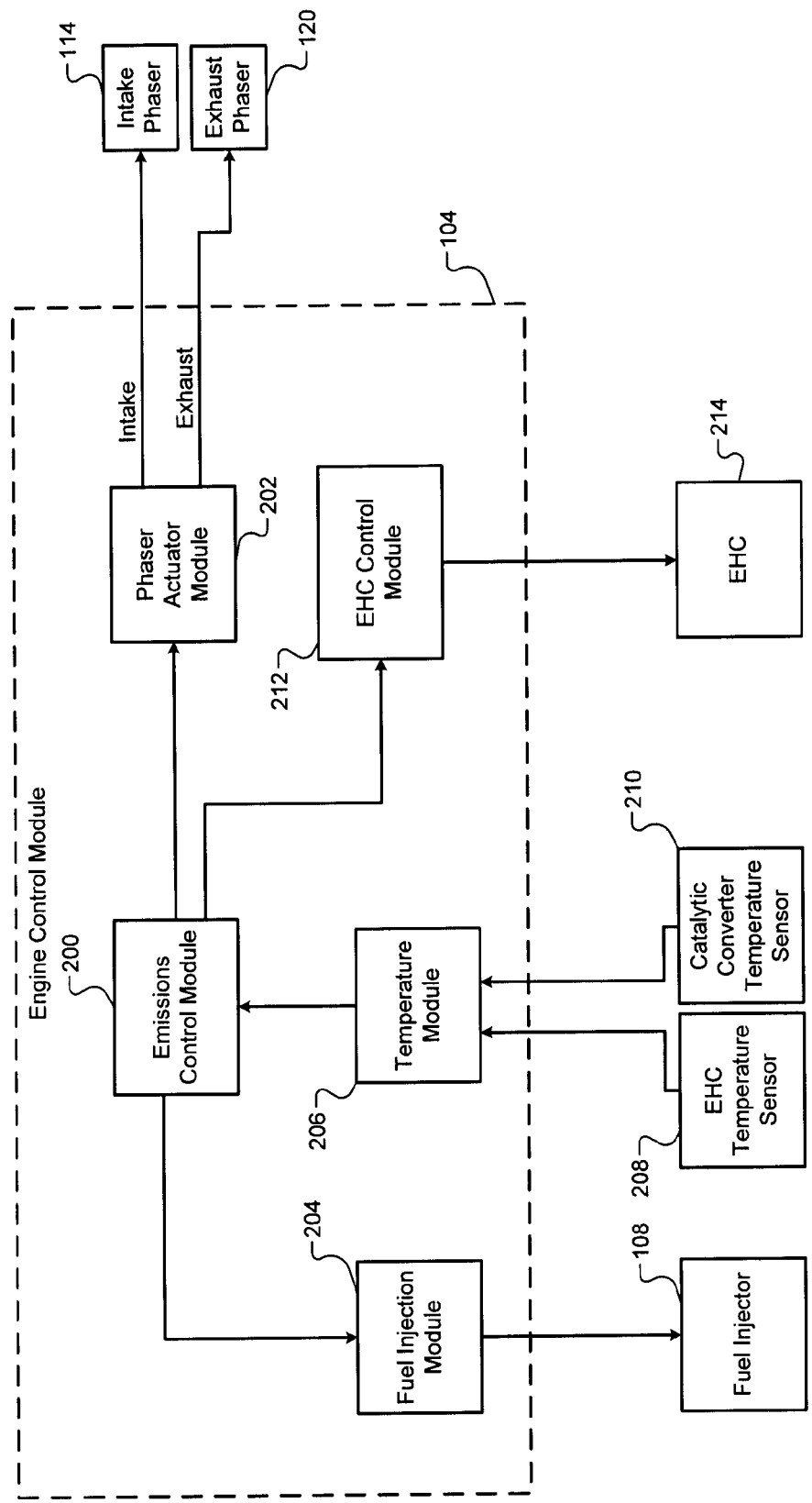
FIG. 2 is a functional block diagram of an engine control module according to the present disclosure.

Referring now to FIG. 2, the engine control module 104 includes an emissions control module 200. The emissions control module 200 communicates with a phaser actuator module 202, controls the cam phasers within the engine 102. The phaser actuator module 202 controls retarding and advancement of the cam phasers. The phaser actuator module 202 controls both the intake and exhaust phasers to improve emissions (i.e. operates in a reduced emissions mode) during a time prior to catalyst light off (i.e. during a cold start).

The emissions control module 200 communicates with a fuel injection module 204. The fuel injection module 204 controls the fuel injector 108. The fuel injector module 204 determines how much fuel to inject into the piston cylinder 110. During the time before the catalyst light off time the A/F ratio is lean in comparison to after the catalyst light off time. The fuel injector module 204 may direct the fuel injector 124 to inject additional pulses of fuel late in an expansion stroke of the cylinder 110 during cold starts to increase the heating of the catalytic converter 126.

The emissions control module 200 communicates with a temperature module 206. The temperature module 206 communicates with an electrically heated catalyst (EHC) temperature sensor 208 and a catalytic converter temperature sensor 210. The EHC temperature sensor 208 and the catalytic converter temperature sensor 210 measure the temperature of catalysts within the catalytic converter 126 (for example, using an estimate, a thermometer, and/or other method). The temperature module 206 communicates whether the catalysts have reached their respective light off temperatures to the emissions control module 200.

The emissions control module 200 communicates with an EHC control module 212. The EHC control module 212 switches an electrically heated catalyst 214 on and off based on a control signal received from the emissions control module 200.

Figure 3:
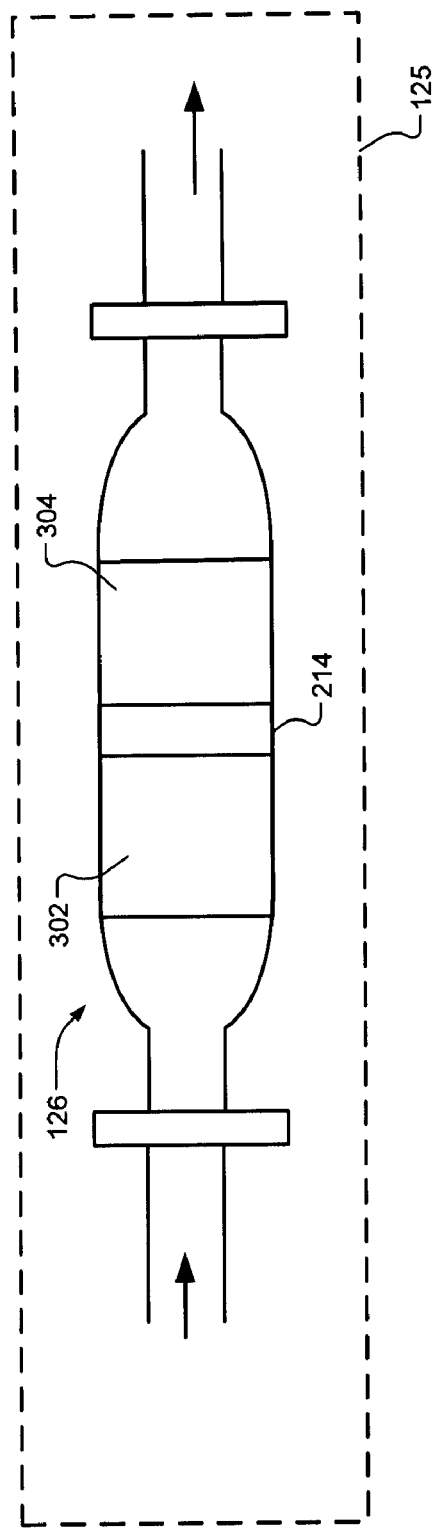
FIG. 3 illustrates an exemplary exhaust arrangement according to the present disclosure.

Referring now to FIG. 3, an exemplary arrangement of the exhaust structure 125 is shown. The exhaust gas flows from the engine 102 toward the atmosphere through the exhaust structure 125. The exhaust gas passes through a catalyst, such as a three way catalyst (TWC)/hydrocarbon absorber 302. The TWC/hydrocarbon absorber 302 absorbs hydrocarbon from the exhaust gas until the hydrocarbon absorber 302 reaches a threshold temperature (for example only, approximately 100 degrees Celsius). The TWC/hydrocarbon absorber 302 absorbs the hydrocarbon but allows other gases such as carbon monoxide and oxygen gases to pass through. The carbon monoxide and oxygen flow into the EHC 214. The electrically heated catalyst 214 oxidizes the carbon monoxide with the oxygen to produce carbon dioxide as and heat. The heat from the oxidation process heats TWC 304, thereby decreasing the time it takes for the TWC 304, and thereby the catalytic converter 126, to reach the light off temperature.

Figure 4:
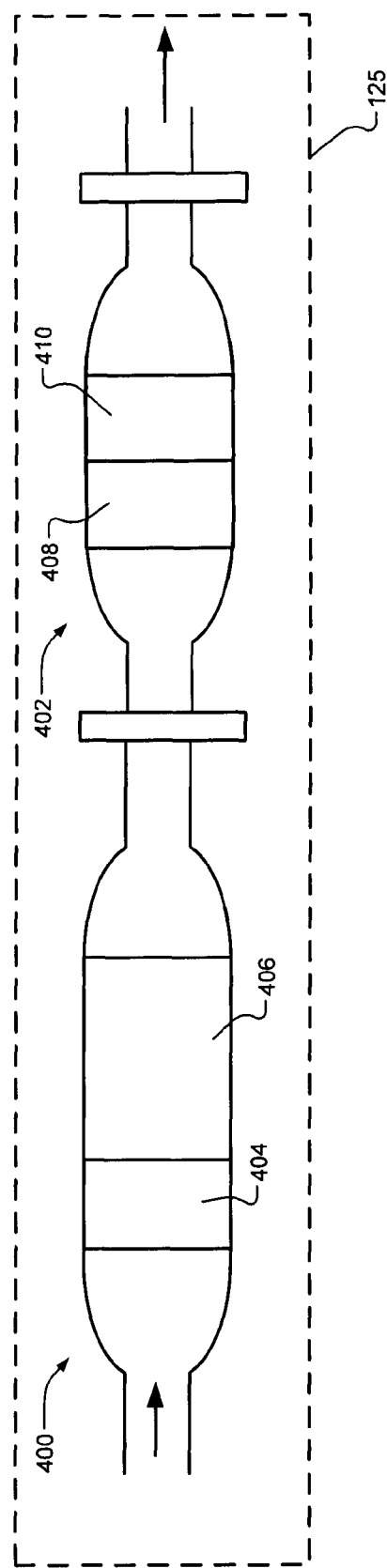
FIG. 4 illustrates a second exemplary exhaust arrangement according to the present disclosure.

Referring now to FIG. 4, another exemplary arrangement of the exhaust structure 125 is shown to include catalytic converters 400 and 402. The catalytic converter 400 includes, for example, a TWC 404 and a TWC/hydrocarbon absorber 406. The TWC/hydrocarbon absorber 406 absorbs hydrocarbon and allows carbon monoxide and oxygen to pass through as described above in FIG. 3. The carbon monoxide and oxygen flow into an EHC 408 of the catalytic converter 402. The EHC 408 oxidizes the carbon monoxide with the oxygen to produce carbon dioxide and heat, increasing the temperature of TWC 410. Accordingly, the required time for the TWC 410 to reach a light off temperature is decreased.

Figure 5:
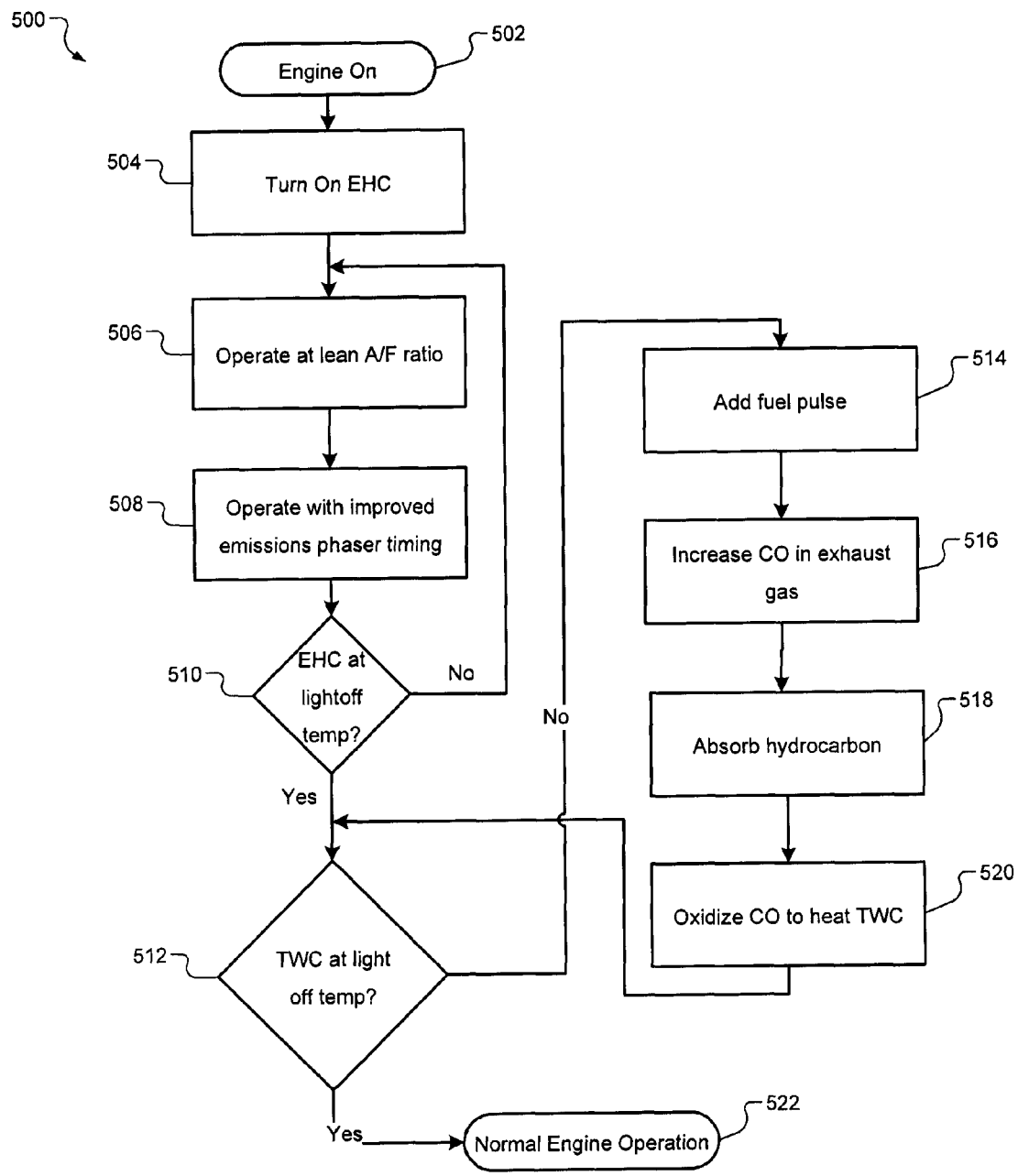
FIG. 5 is a flow chart illustrating the steps of an emission reduction method according to the present disclosure.

Referring now to FIG. 5, a method 500 for reducing emissions in a turbo charged engine is shown. In step 502, the engine is turned on. The engine is started using a lean A/F ratio (i.e. less fuel than a stoichiometric A/F ratio) in step 504. In step 506, the EHC control module 212 turns on the EHC 214. The emission control module 200 varies phaser timing for lower emissions in step 508. The emissions may also be lowered by using methods such as double injection, a retarded spark, early intake phasing, and a very lean air to fuel ratio.

In step 510, the temperature module 206 determines the electrically heated catalyst temperature. The emission control module 200 continues to direct the fuel injector module 204 to inject a lean amount of fuel and to direct the phaser actuation module 202 to control the phaser timing for lower emissions. When the electrically heated catalyst 214 reaches its light off temperature, the emissions control module determines whether the catalytic converter 126 has reached its light off temperature in step 512. If the catalytic catalyst 126 has not reached its light off temperature, the method 500 continues to step 514. In step 514 the emissions control module 200 instructs the phaser actuator module 202 and the fuel injection module 204 to include an additional fuel pulse late in an expansion stroke of the piston 110. As a result, carbon monoxide is created in the exhaust stream. In step 516, the carbon monoxide is used for the oxidation reaction that occurs within the electrically heated catalyst 214 to heat the catalytic converter 126.

In step 518, the TWC/hydrocarbon absorber 302 absorbs hydrocarbon in the exhaust structure 125. The TWC/hydrocarbon absorber 302 absorbs the hydrocarbon emissions until the TWC/hydrocarbon absorber reaches a threshold temperature (for example only, approximately 100 degrees Celsius).

In step 520, the electrically heated catalyst 214 oxidizes the carbon monoxide to create heat for the TWC 304. The method 500 repeats steps 512-520 until the TWC 304 of the catalytic converter 126 reaches the light off temperature. When the TWC 304 reaches the light off temperature, the method 500 continues to step 522 and operates the engine 102 normally. For example, the method 500 turns off the EHC and operates at a stoichiometric A/F ratio.

Those skilled in the art can now appreciate from the foregoing description that the broad teachings of the current disclosure can be implemented in a variety of forms. Therefore, while this disclosure has been described in connection with particular examples thereof, the true scope of the invention should not be so limited since other modifications will become apparent to the skilled practitioner upon a study of the drawings, the specification and the following claims.

What is claimed is:

1. An emissions reduction system comprising;
   an emissions control module that selectively controls fuel injection at a lean A/F ratio when a first temperature of a catalytic converter is less than a first threshold and that selectively turns on an electrically heated catalyst (EHC) based on the first temperature; and
   a fuel injection module that selectively injects fuel into an engine cylinder during at least one of an expansion stroke and an exhaust stroke when a second temperature of the EHC is less than a second threshold.

2. The system of claim 1 further comprising a phaser actuation module that selectively controls an intake phaser and an exhaust phaser in a reduced emissions mode based on the first temperature.

3. The system of claim 2 wherein the phaser actuation module selectively controls at least one of the intake and exhaust phaser in a normal operation mode when the first temperature is greater than or equal to the first threshold.

4. The system of claim 1 wherein the first threshold corresponds to a light off temperature of the catalytic converter and the second threshold corresponds to a light off temperature of the EHC.

5. The system of claim 4 wherein the emissions control module controls the fuel injection at a stoichiometric A/F ratio when the first temperature is greater than or equal to the first threshold.

6. The system of claim 4 wherein the emissions control module turns off the EHC when the second temperature is greater than or equal to the second threshold.

7. A method for reducing emissions comprising:
   selectively controlling fuel injection at a lean A/F ratio when a first temperature of a catalytic converter is less than a first threshold;
   selectively turning on an electrically heated catalyst (EHC) based on the first temperature; and
   selectively injecting fuel into an engine cylinder during an expansion stroke when a second temperature of the EHC is less than a second threshold.

8. The method of claim 7 further comprising selectively controlling an intake phaser and an exhaust phaser in a reduced emissions mode based on the first temperature.

9. The method of claim 8 further comprising selectively controlling at least one of the intake and exhaust phaser in a normal operation mode when the first temperature is greater than or equal to the first threshold.

10. The method of claim 7 wherein the first threshold corresponds to a light off temperature of the catalytic converter and the second threshold corresponds to a light off temperature of the EHC.

11. The method of claim 10 further comprising controlling the fuel injection at a stoichiometric A/F ratio when the first temperature is greater than or equal to the first threshold.

12. The method of claim 10 further comprising turning off the EHC when the second temperature is greater than or equal to the second threshold.

* * * * *